United States Patent
Li et al.

(10) Patent No.: US 11,995,302 B2
(45) Date of Patent: May 28, 2024

(54) INTERFACE INFORMATION PRESENTING METHOD AND ELECTRONIC DEVICE

(71) Applicant: HUAWEI TECHNOLOGIES CO., LTD., Guangdong (CN)

(72) Inventors: Shuai Li, Shanghai (CN); Binke Yu, Shenzhen (CN); Xiaoxiao Chen, Nanjing (CN); Jing Chang, Nanjing (CN); Yulong Xue, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/308,351

(22) Filed: Apr. 27, 2023

(65) Prior Publication Data

US 2023/0259262 A1    Aug. 17, 2023

Related U.S. Application Data

(63) Continuation of application No. PCT/CN2021/118705, filed on Sep. 16, 2021.

(30) Foreign Application Priority Data

Oct. 30, 2020 (CN) .......................... 202011192696.4

(51) Int. Cl.
*G06F 3/04845* (2022.01)
*G06F 3/0488* (2022.01)

(52) U.S. Cl.
CPC ........ *G06F 3/04845* (2013.01); *G06F 3/0488* (2013.01); *G06F 2203/04806* (2013.01)

(58) Field of Classification Search
CPC .................................................. G06F 3/04845
USPC .......................................................... 715/799
See application file for complete search history.

(56) References Cited

U.S. PATENT DOCUMENTS

| | | | |
|---|---|---|---|
| 9,459,687 B2 * | 10/2016 | Park .................. | G06F 13/00 |
| 11,755,192 B1 * | 9/2023 | Thomas ............ | G06F 3/04842 |
| | | | 715/769 |
| 2009/0158168 A1 * | 6/2009 | Heo .................. | H04M 1/72469 |
| | | | 715/747 |

(Continued)

FOREIGN PATENT DOCUMENTS

| | | |
|---|---|---|
| CN | 104200170 A | 12/2014 |
| CN | 106648577 A | 5/2017 |

(Continued)

OTHER PUBLICATIONS

International Search Report and Written Opinion in International Appln. No. PCT/CN2021/118705, mailed on Dec. 15, 2021, 14 pages (with English translation).

(Continued)

*Primary Examiner* — Reza Nabi
(74) *Attorney, Agent, or Firm* — Fish & Richardson P.C.

(57) ABSTRACT

Example interface information presenting methods, electronic devices and computer-readable storage media are provided. An example method includes: obtaining a target interface; in response to a first operation of a user, entering a screen-locked state, and obtaining a first picture displayed in the screen-locked state; processing the target interface to obtain a target picture; and displaying the target picture in the screen-locked state, to cover the first picture.

18 Claims, 3 Drawing Sheets

(56) References Cited

U.S. PATENT DOCUMENTS

| | | | | |
|---|---|---|---|---|
| 2009/0251418 A1* | 10/2009 | Cho | ................ | G06F 3/017 |
| | | | | 345/184 |
| 2010/0088597 A1* | 4/2010 | Shin | ................ | G06F 8/38 |
| | | | | 715/867 |
| 2010/0100841 A1* | 4/2010 | Shin | ................ | H04M 1/72469 |
| | | | | 715/764 |
| 2012/0015693 A1* | 1/2012 | Choi | ................ | H04M 1/72454 |
| | | | | 455/566 |
| 2013/0169573 A1* | 7/2013 | Nishio | ................ | H04M 1/66 |
| | | | | 345/173 |
| 2013/0179832 A1* | 7/2013 | Bhola | ................ | G06F 16/9535 |
| | | | | 715/764 |
| 2013/0187861 A1* | 7/2013 | Lavallee | ................ | G06F 3/0486 |
| | | | | 345/173 |
| 2014/0092278 A1* | 4/2014 | Takahashi | ................ | H04N 5/772 |
| | | | | 348/231.3 |
| 2014/0164941 A1* | 6/2014 | Kim | ................ | G06F 3/0488 |
| | | | | 715/741 |
| 2014/0245202 A1* | 8/2014 | Yoon | ................ | G06F 3/0482 |
| | | | | 715/765 |
| 2014/0283112 A1* | 9/2014 | Wang | ................ | G06F 21/36 |
| | | | | 726/27 |
| 2015/0007157 A1* | 1/2015 | Park | ................ | G06F 8/65 |
| | | | | 717/170 |
| 2015/0245199 A1 | 8/2015 | Blitzstein | | |
| 2015/0254464 A1* | 9/2015 | Shah | ................ | G06F 21/46 |
| | | | | 726/18 |
| 2015/0334219 A1* | 11/2015 | Soundararajan | ................ | H04M 1/67 |
| | | | | 455/414.1 |
| 2016/0077606 A1 | 3/2016 | Hyun et al. | | |
| 2017/0300187 A1* | 10/2017 | Lee | ................ | G06F 3/0481 |
| 2018/0232456 A1* | 8/2018 | Sherman | ................ | H04L 41/0246 |
| 2018/0332157 A1* | 11/2018 | Soundararajan | ................ | H04M 1/67 |
| 2021/0397342 A1* | 12/2021 | Luo | ................ | G06F 3/0442 |
| 2022/0174145 A1* | 6/2022 | Wilson | ................ | G06F 3/0485 |
| 2022/0317841 A1* | 10/2022 | Zheng | ................ | G06F 3/0484 |
| 2023/0117161 A1* | 4/2023 | Han | ................ | G06F 3/04815 |
| | | | | 715/771 |

FOREIGN PATENT DOCUMENTS

| | | |
|---|---|---|
| CN | 108702414 A | 10/2018 |
| CN | 110287741 A | 9/2019 |
| CN | 110795746 A | 2/2020 |
| WO | 2017193645 A1 | 11/2017 |

OTHER PUBLICATIONS

Extended European Search Report in European Appln No. 21884808.3, dated Feb. 27, 2024, 11 pages.

* cited by examiner

INTERFACE INFORMATION PRESENTING METHOD AND ELECTRONIC DEVICE

CROSS-REFERENCE TO RELATED APPLICATIONS

This application is a continuation of International Application No. PCT/CN2021/118705, filed on Sep. 16, 2021, which claims priority to Chinese Patent Application No. 202011192696.4, filed on Oct. 30, 2020. The disclosures of the aforementioned applications are hereby incorporated by reference in their entireties.

TECHNICAL FIELD

This application relates to the field of intelligent terminal technologies, and in particular, to an interface information presenting method and an electronic device.

BACKGROUND

In a use process of an intelligent terminal, a user usually needs to present interface information displayed on the intelligent terminal to another person for viewing, for example, a picture in a gallery of a mobile phone, an anecdote in an APP application, news, a microblog, an electronic file, a game screenshot, or chat information. However, because the intelligent terminal stores personal privacy information of the user, when the user presents the interface information of the intelligent terminal to another person for viewing, the user usually worries that leakage of the personal information of the user occurs when the another person slides the interface on the intelligent terminal.

For example, the mobile phone is in an unlocked state when the user presents the interface information of the mobile phone, for example, a photo in the gallery of the mobile phone, to the another person for viewing. If the another person slides a screen of the mobile phone or performs a misoperation on the screen of the mobile phone, the mobile phone interface may jump to a next photo or a previous photo; or the photo is deleted; or the another person may open another application in the mobile phone arbitrarily, for example, an application such as Messages, Alipay, WeChat, or QQ; or a short message of a mobile phone application, a WeChat message, a QQ message, or the like suddenly arrives and pops up in the presenting process. As a result, leakage of personal information of the user is likely to occur, and inconvenience is caused to the user.

SUMMARY

This application provides an interface information presenting method and an electronic device, so that when a user presents interface information of an intelligent terminal to another person, leakage of personal information of the user is not likely to occur, to provide security assurance.

According to a first aspect, this application provides an interface information presenting method, including:
  obtaining a target interface;
  entering a screen-locked state, and obtaining a first picture displayed in the screen-locked state, in response to a first operation of a user;
  processing the target interface, to obtain a target picture; and
  displaying the target picture in the screen-locked state, to cover the first picture.

In a possible implementation, the processing the target interface, to obtain a target picture includes:
  taking a screenshot of the target interface, to obtain the target picture.

In a possible implementation, the processing the target interface, to obtain a target picture includes:
  invoking a picture corresponding to the target interface, to obtain the target picture.

In a possible implementation, the first operation of the user includes tapping one or more buttons in a specified manner.

In a possible implementation, the first operation of the user includes tapping, by touching a screen, a preset icon displayed in a notification bar or a floating window.

In a possible implementation, the first operation of the user includes double tapping a power button. The entering a screen-locked state, and obtaining a first picture displayed in the screen-locked state, in response to the first operation of the user; and processing the target interface, to obtain a target picture includes:
  locking a screen and storing the target interface in response to tapping the power button for the first time; and
  taking a screenshot of the target interface in response to tapping the power button for the second time after a preset time interval, to obtain the target picture.

In a possible implementation, the method further includes: hiding a message prompt in the screen-locked state.

In a possible implementation, the method further includes:
  zooming in or out the target picture and/or moving the target picture in the screen-locked state in response to a second operation of the user.

According to a second aspect, this application provides an interface information presenting apparatus, including:
  an interface obtaining module, configured to obtain a target interface;
  a lock screen module, configured to enter a screen-locked state, and obtain a first picture displayed in the screen-locked state, in response to a first operation of a user;
  a processing module, configured to process the target interface, to obtain a target picture; and
  a display module, configured to display the target picture in the screen-locked state, to cover the first picture.

In a possible implementation, the processing module includes a screenshot module, configured to take a screenshot of the target interface, to obtain the target picture.

In a possible implementation, the processing module includes a picture invoking module, configured to invoke a picture corresponding to the target interface, to obtain the target picture.

In a possible implementation, the first operation of the user includes tapping one or more buttons in a specified manner.

In a possible implementation, the first operation of the user includes tapping, by touching a screen, a preset icon displayed in a notification bar or a floating window.

In a possible implementation, the first operation of the user includes double tapping a power button, and the lock screen module is configured to: lock a screen and store the target interface in response to tapping the power button for the first time; and the processing module is configured to take a screenshot of the target interface in response to tapping the power button for the second time after a preset time interval, to obtain the target picture.

In a possible implementation, the apparatus further includes a hiding module, configured to hide a message prompt in the screen-locked state.

In a possible implementation, the apparatus further includes a picture processing module, configured to: zoom in or out the target picture and/or move the target picture in the screen-locked state in response to a second operation of the user.

According to a third aspect, this application provides an electronic device, including:

a display, one or more processors, a memory, a plurality of applications, and one or more computer programs, where the one or more computer programs are stored in the memory, the one or more computer programs include instructions, and when the instructions are executed by the device, the device is enabled to perform the following steps:

obtaining a target interface;

entering a screen-locked state, and obtaining a first picture displayed in the screen-locked state, in response to a first operation of a user;

processing the target interface, to obtain a target picture; and displaying the target picture in the screen-locked state, to cover the first picture.

In a possible implementation, when the instructions are executed by the device, the step of processing the target interface, to obtain a target picture performed by the device includes:

taking a screenshot of the target interface in response to a user operation, to obtain the target picture.

In a possible implementation, when the instructions are executed by the device, the step of processing the target interface, to obtain a target picture performed by the device includes:

invoking a picture corresponding to the target interface in response to a user operation, to obtain the target picture.

In a possible implementation, the first operation of the user includes tapping one or more buttons in a specified manner.

In a possible implementation, the first operation of the user includes tapping, by touching a screen, a preset icon displayed in a notification bar or a floating window.

In a possible implementation, the first operation of the user includes double tapping a power button, and when the instructions are executed by the device, the step of entering a screen-locked state, and obtaining a first picture displayed in the screen-locked state, in response to a first operation of the user; and processing the target interface, to obtain a target picture performed by the device includes:

locking a screen and storing the target interface in response to tapping the power button for the first time; and taking a screenshot of the target interface in response to tapping the power button for the second time after a preset time interval, to obtain the target picture.

In a possible implementation, when the instructions are executed by the device, the device further performs the following step: hiding a message prompt in the screen-locked state.

In a possible implementation, when the instructions are executed by the device, the device further performs the following step:

zooming in or out the target picture and/or moving the target picture in the screen-locked state in response to a second operation of the user.

According to a fourth aspect, this application provides a computer-readable storage medium. The computer-readable storage medium stores a computer program, and when the computer program is run on a computer, the computer is enabled to perform the method according to the first aspect.

According to a fifth aspect, this application provides a computer program, where when the computer program is executed by a computer, the computer program is used to perform the method according to the first aspect.

In a possible design, all or some of the programs in the fifth aspect may be stored in a storage medium encapsulated with a processor, or some or all of the programs may be stored in a memory that is not encapsulated with the processor.

DESCRIPTION OF EMBODIMENTS

Terms used in embodiments of this application are only used to explain specific embodiments of this application, but are not intended to limit this application.

In an existing implementation solution, a mobile phone is in an unlocked state when a user presents interface information of the intelligent terminal, for example, a photo in the gallery of the mobile phone, to the another person for viewing. If another person slides a screen of the mobile phone or performs a misoperation on the screen of the mobile phone, the mobile phone interface may jump to a next photo or a previous photo; or the photo is deleted; or the another person may open another application in the mobile phone arbitrarily, for example, an application such as Messages, Alipay, WeChat, or QQ; or a short message of a mobile phone application, a WeChat message, a QQ message, or the like suddenly arrives and pops up in the presenting process. As a result, leakage of personal information of the user is likely to occur, and inconvenience is caused to the user.

Therefore, this application provides an interface information presenting method, so that when the user presents interface information of the intelligent terminal to another person, leakage of personal information of the user is not likely to occur, to provide security assurance.

Figure 1:
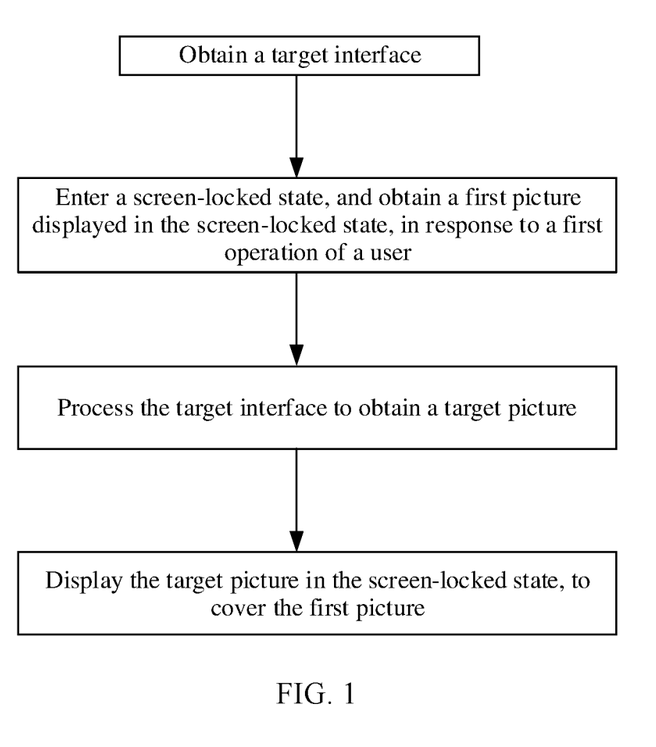
FIG. 1 is a flowchart of an embodiment of an interface information presenting method according to this application.

FIG. 1 is a flowchart of an embodiment of an interface information presenting method according to this application. As shown in FIG. 1, the interface information presenting method may include the following steps:

S101: Obtain a target interface.

It may be understood that the target interface may include a currently displayed interface of an intelligent terminal, and the target interface may include an interface that a user wants to present to another person. For example, the user wants to present the currently displayed interface of the intelligent terminal to another person. In this embodiment, the target interface may include information displayed on the interface, for example, a picture (including a static picture such as a picture in a JPG format, or a dynamic picture such as a picture in a GIF format), a text, chat information, a game screenshot, or an image. That is, the information displayed on the target interface may include interface information that is of the intelligent terminal and that is presented by the user to another person. The intelligent terminal may include a device such as a mobile terminal (mobile phone), a smart screen, an uncrewed aerial vehicle, an intelligent connected vehicle (ICV for short), an intelligent (automotive) vehicle (smart/intelligent car), or a vehicle-mounted device.

For example, the target interface may include a gallery interface displayed by the intelligent terminal, and the gallery interface may include at least one picture. Alternatively, the target interface may include an interface that is of an APP application and that is displayed by the intelligent terminal, and the interface of the APP application may include a text, a paragraph, an article, news, a headline, and the like. Alternatively, the target interface may include a chat interface (for example, a WeChat chat interface, a QQ chat interface, or an Alipay chat interface) displayed by the intelligent terminal, and the chat interface includes chat information, transfer information, or the like. Alternatively, the target interface may include a game interface displayed by the intelligent terminal, and the game interface may include a game screenshot, a game image, or the like. This is not limited herein.

S102: Enter a screen-locked state, and obtain a first picture displayed in the screen-locked state, in response to a first operation of the user.

It should be noted that the first operation of the user may include an operation performed by the user on the intelligent terminal, and may include a contact operation such as tapping or pressing a preset button of the intelligent terminal, or a contactless operation such as controlling the intelligent terminal by using a voice or a gesture.

In response to the first operation of the user, the intelligent terminal enters the screen-locked state. In the screen-locked state, the intelligent terminal cannot respond to some operations of the user. For example, some touch-screen operations of the user, such as tapping a screen, cannot be responded to by the intelligent terminal, so that some functions of the intelligent terminal are limited. For example, the intelligent terminal cannot jump to an interface. In the screen-lock manner, leakage of user information due to a misoperation or a malicious operation of another person on the intelligent terminal is not likely to occur.

The first picture may include a lock screen picture displayed in a lock screen interface of the intelligent terminal. In other words, the first picture may include an original lock screen picture that is of the intelligent terminal and that is displayed in the screen-locked state. It may be understood that, in step S102, the first picture may not be displayed in the screen-locked state.

In a possible implementation, the first operation of the user includes tapping one or more buttons in a specified manner. For example, the intelligent terminal includes the one or more buttons, and the buttons may include a physical button or a virtual button, such as a power button, a back button, a home button, a function button, or a volume button. This is not limited herein. When the user taps the one or more buttons of the intelligent terminal in a specified manner, the intelligent terminal enters the screen-locked state, and obtains the first picture displayed in the screen-locked state.

In a possible implementation, the first operation of the user includes tapping, by touching a screen, a preset icon displayed in a notification bar or a floating window. It may be understood that, the intelligent terminal may include a notification bar or a floating window, for example, a pull-down notification bar of a mobile phone, or a floating window displayed in a mobile phone interface. The notification bar or the floating window may be opened by a user through an operation. After the notification bar or the floating window is opened, at least one icon may be displayed, and the icon may be tapped by touching a screen, so that the intelligent terminal is triggered to perform a corresponding function. The preset icon may have a specified identifier, such as a graph or a text, so that the user can easily identify the preset icon. When the user taps, by touching a screen, the preset icon displayed in the notification bar or the floating window, the intelligent terminal enters the screen-locked state, and obtains the first picture displayed in the screen-locked state.

In a possible implementation, the first operation of the user includes sending a voice for interaction with a voice assistant. In other words, the intelligent terminal may include a voice assistant used for voice interaction. The voice assistant may identify a voice sent by the user, and the intelligent terminal performs a corresponding operation. For example, the voice assistant includes a voice assistant Xiao Ai of a Xiaomi mobile phone, a voice assistant Siri of an Apple mobile phone, a voice assistant Breeno of an Oppo mobile phone, and a voice assistant Celia of a Huawei mobile phone. This is not limited herein. When a user sends a specified voice, the voice assistant of the intelligent terminal receives and recognizes the voice, so that the intelligent terminal enters the screen-locked state, and obtains the first picture displayed in the screen-locked state.

A person skilled in the art should understand that the first operation may be further implemented as another action that can operate the intelligent terminal. The first operation causes a preset change of data in a database of the intelligent terminal, so that the intelligent terminal makes a corresponding response. This is not limited herein. For example, the intelligent terminal (for example, a double-sided foldable mobile phone) is folded in a specified manner, so that the intelligent terminal enters the screen-locked state, and obtains the first picture displayed in the screen-locked state.

S103: Process the target interface, to obtain a target picture.

In other words, the target picture may include information displayed in the target interface, for example, a picture or a text.

In a possible implementation, step S103 includes: taking a screenshot of the target interface, to obtain the target picture. In other words, the target picture is a screenshot picture obtained through screenshot. In this embodiment, the taking a screenshot of the target interface may include: taking a screenshot of a page currently displayed in the target interface, to determine the target picture. In other words, the target picture may include a screenshot currently displayed in the target interface, to display information such as a picture or a text currently displayed in the target interface. Alternatively, the taking a screenshot of the target interface may include: taking a scrolling screenshot of the target interface, to determine the target picture. In other words, the target picture may include a screenshot or a long screenshot displayed in a scrolling mode in the target interface, so that the target picture obtained may include the screenshot displayed in the scrolling mode in the target interface, to display information such as a picture or a text displayed in the scrolling mode in the target interface. A person skilled in the art may understand that, the taking a screenshot of the target interface may further include: taking a partial screenshot of the target interface, to determine the target picture, that is, the target picture includes a partial screenshot of the target interface, to display partial information such as a picture or a text currently displayed in a part of the target interface.

In a possible implementation, step S103 includes: invoking a picture corresponding to the target interface, to obtain the target picture. Specifically, the target interface may correspond to at least one currently displayed picture. For example, the target interface is an interface that displays a photo in a gallery, and the target interface corresponds to a currently displayed photo in the gallery. In other words, the target picture may include a picture in the gallery. Certainly, the target interface may alternatively be an interface displayed in another application, for example, an interface displayed in a browser. The interface may correspond to a picture displayed on a current web page, and the like. This is not limited herein.

It should be noted that in an optional implementation, step S102 and step S103 may be replaced with the following:
S102a: Process the target interface in response to a first operation of the user, to obtain a target picture.
S103a: Enter a screen-locked state, and obtain a first picture displayed in the screen-locked state.

In other words, in response to the first operation performed by the user, the step of processing the target interface, to obtain the target picture may be first performed, and then the step of entering the screen-locked state and obtaining the first picture displayed in the screen-locked state is performed. Alternatively, in response to the first operation of the user, the step of entering the screen-locked state and obtaining the first picture displayed in the screen-locked state may be first performed, and then the step of processing the target interface, to obtain the target picture is performed.

Figure 2:
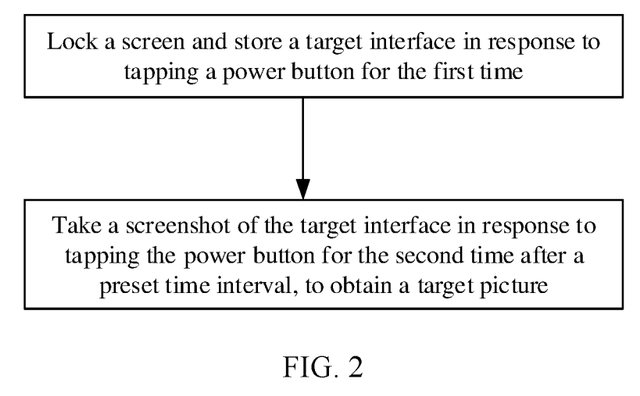
FIG. 2 is a schematic diagram of an embodiment of obtaining a target picture in an interface information presenting method according to this application.

In a possible implementation, as shown in FIG. 2, the first operation of the user includes double tapping a power button. The entering a screen-locked state, and obtaining a first picture displayed in the screen-locked state, in response to the first operation of the user; and processing the target interface, to obtain a target picture includes:
S201: Lock a screen and store the target interface in response to tapping the power button for the first time.
S202: Take a screenshot of the target interface in response to tapping the power button for the second time after a preset time interval, to obtain the target picture.

It may be understood that, when the user taps the power button for the first time, the intelligent terminal enters the screen-locked state, and stores the target interface. If the user taps the power button for the second time after the preset time interval, the intelligent terminal performs the step of taking a screenshot of the target interface, to obtain the target picture. The target picture may be stored. If the user does not tap the power button for the second time after the preset time interval, the intelligent terminal does not perform the step of taking a screenshot of the target interface, to obtain the target picture. In this case, the intelligent terminal is still in the screen-locked state, to ensure information security of the user. It may be understood that the preset time interval may be adjusted to meet an operation requirement of a user.
S104: Display the target picture in the screen-locked state, to cover the first picture.

Specifically, in the screen-locked state, the first picture is covered by the target picture and is not displayed, and the target picture is used as a lock screen picture and displayed. In other words, in the screen-locked state, the target picture is displayed, so that the intelligent terminal is in the screen-locked state, and the target picture can be presented to another person. Therefore, leakage of personal information of the user is not easily caused. More specifically, the intelligent terminal may include a lock screen window, and the lock screen window includes the first picture, the target picture is topped on the lock screen window to cover the first picture, and in the screen-locked state, the target picture on the lock screen window is displayed.

In a possible implementation, the method further includes: hiding a message prompt in the screen-locked state.

Specifically, in the screen-locked state, a message prompt of an application of the intelligent terminal is hidden, so that a message cannot be displayed in the screen-locked state, that is, a message cannot be displayed in the lock screen interface in the screen-locked state, to ensure that when the interface information is presented to another person, leakage of user information caused by pop-up of a message does not occur in the intelligent terminal. The message is, for example, a message of an application such as WeChat, Messages, QQ, or Alipay.

In a possible implementation, the method further includes:
zooming in or out the target picture and/or moving the target picture in the screen-locked state in response to a second operation of the user.

Specifically, the second operation may include a gesture of zooming in or out and/or moving the target picture by the user touching a screen. That is, in the screen-locked state, the user may perform, on a screen of the intelligent terminal, a touch-screen operation of zooming in or out and/or moving the target picture, so that the target picture is zoomed in or out and/or moved for display, and the like, to provide good user experience. More specifically, a program instruction for identifying and zooming in or out and/or moving a picture in the lock screen window is programmed in the intelligent terminal, so that in the screen-locked state, the intelligent terminal can implement, in response to the second operation of the user, the step of zooming in or out the target picture and/or moving the target picture. A person skilled in the art may understand that, in the screen-locked state, the intelligent terminal may alternatively perform other steps that can be performed on the target picture, for example, cutting, marking, highlighting, and altering, which is not limited herein.

It may be understood that some or all of the steps or operations in the foregoing embodiments are merely examples. In embodiments of this application, other operations or variations of various operations may be further performed. In addition, the steps may be performed in a sequence different from that presented in the foregoing embodiments, and not all operations in the foregoing embodiments may need to be performed.

Figure 3:
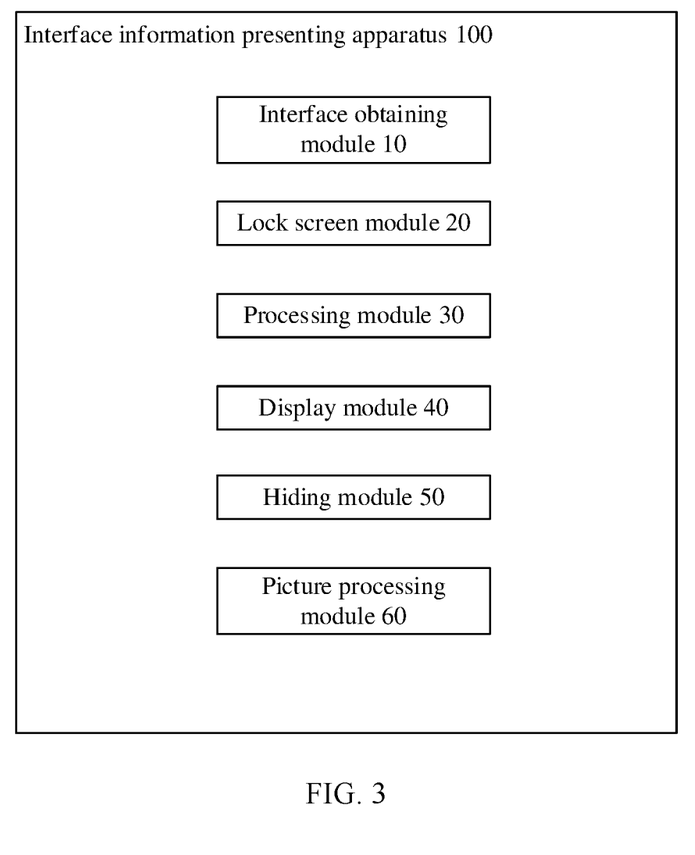
FIG. 3 is a schematic diagram of a structure of an embodiment of an interface information presenting apparatus according to this application.

FIG. 3 is a schematic diagram of a structure of an embodiment of an interface information presenting apparatus according to this application. As shown in FIG. 3, the interface information presenting apparatus 100 may include an interface obtaining module 10, a lock screen module 20, a processing module 30, and a display module 40. It should be understood that the apparatus 100 may correspond to an electronic device 900 shown in FIG. 5. Functions of the interface obtaining module 10, the lock screen module 20, and the processing module 30 may be implemented by a processor 910 in the electronic device 900 shown in FIG. 5, and a function of the display module 40 may be implemented by a display unit 970 in the electronic device 900 shown in FIG. 5.

The interface obtaining module 10 is configured to obtain a target interface.

The lock screen module 20 is configured to enter a screen-locked state, and obtain a first picture displayed in the screen-locked state, in response to a first operation of a user.

The processing module 30 is configured to process the target interface, to obtain a target picture.

The display module 40 is configured to display the target picture in the screen-locked state, to cover the first picture.

Figure 4:
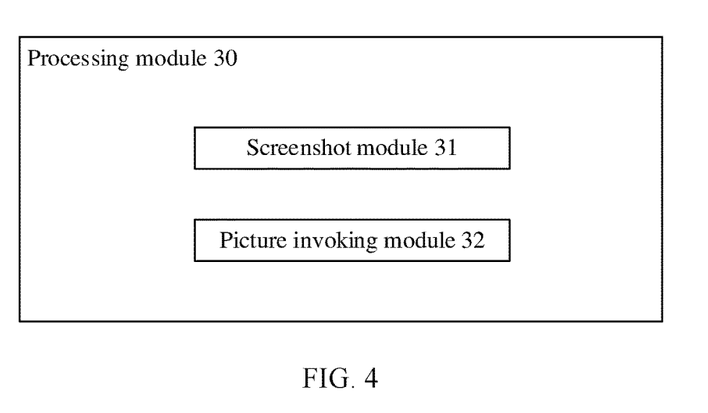
FIG. 4 is a schematic diagram of a structure of a processing module in an interface information presenting apparatus according to this application.

In a possible implementation, as shown in FIG. 4, the processing module 30 includes a screenshot module 31, configured to take a screenshot of the target interface, to obtain the target picture.

In a possible implementation, the processing module 30 includes a picture invoking module 32, configured to invoke a picture corresponding to the target interface, to obtain the target picture.

In a possible implementation, the first operation of the user includes tapping one or more buttons in a specified manner.

In a possible implementation, the first operation of the user includes tapping, by touching a screen, a preset icon displayed in a notification bar or a floating window.

In a possible implementation, the first operation of the user includes sending a voice for interaction with a voice assistant.

In a possible implementation, the first operation of the user includes double tapping a power button, and the lock screen module 20 is configured to: lock a screen and store the target interface in response to tapping the power button for the first time; and the processing module 30 is configured to take a screenshot of the target interface in response to tapping the power button for the second time after a preset time interval, to obtain the target picture.

In a possible implementation, the apparatus 100 further includes a hiding module 50, configured to hide a message prompt in the screen-locked state.

In a possible implementation, the apparatus 100 further includes a picture processing module 60, configured to: zoom in or out the target picture and/or move the target picture in the screen-locked state in response to a second operation of the user.

The interface information presenting apparatus 100 provided in the embodiment shown in FIG. 3 may be configured to execute the technical solution in the method embodiment shown in FIG. 1 in this application. For an implementation principle and technical effects of the apparatus 100, further refer to related descriptions in the method embodiment.

Figure 5:
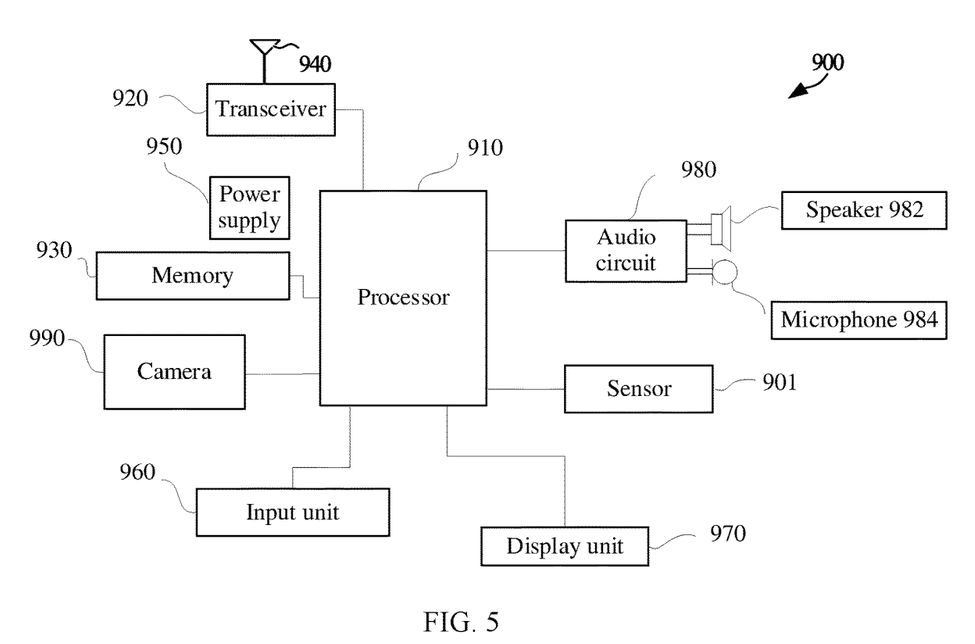
FIG. 5 is a schematic diagram of a structure of an embodiment of an electronic device according to this application.

It should be understood that the interface information presenting apparatus 100 may correspond to the electronic device 900 shown in FIG. 5. Functions of the interface obtaining module 10, the lock screen module 20, the processing module 30 and a submodule thereof, the hiding module 50, and the picture processing module 60 may be implemented by the processor 910 in the electronic device 900 shown in FIG. 5, and the display module 40 may be implemented by the display unit 970 in the electronic device 900 shown in FIG. 5.

The interface information presenting apparatus 100 provided in the embodiment shown in FIG. 3 may be configured to perform the technical solutions in the method embodiments shown in FIG. 1 and FIG. 2 in this application. For an implementation principle and technical effects of the apparatus 100, further refer to related descriptions in the method embodiments.

It should be understood that division of the modules of the interface information presenting apparatus 100 shown in FIG. 3 and FIG. 4 is merely logical function division. In actual implementation, all or some of the modules may be integrated into one physical entity, or the modules may be physically separated. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, a detection module may be a separately-disposed processing element, or may be integrated into a chip of an electronic device for implementation. Implementations of other modules are similar to the implementation of the detection module. In addition, all or some of the modules may be integrated together, or may be implemented independently. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (ASICs for short below), one or more microprocessors (Digital Signal Processors, DSPs for short below), or one or more field programmable gate arrays (FPGAs for short below). For another example, the modules may be integrated together, and implemented in a form of a system-on-a-chip (SOC for short below).

FIG. 5 is a schematic diagram of a structure of an embodiment of an electronic device according to this application. As shown in FIG. 5, the electronic device may include a display, one or more processors, a memory, a plurality of applications, and one or more computer programs.

The display may include a display of an in-vehicle computer (Mobile Data Center). The electronic device may be a device such as a mobile terminal (mobile phone), a smart screen, an uncrewed aerial vehicle, an intelligent connected vehicle (ICV for short), an intelligent vehicle (smart/intelligent car), or a vehicle-mounted device.

The one or more computer programs are stored in the memory, the one or more computer programs include instructions, and when the instructions are executed by the device, the device is enabled to perform the following steps:
   obtaining a target interface;
   entering a screen-locked state, and obtaining a first picture displayed in the screen-locked state, in response to a first operation of a user;
   processing the target interface, to obtain a target picture; and
   displaying the target picture in the screen-locked state, to cover the first picture.

In a possible implementation, when the instructions are executed by the device, the step of processing the target interface, to obtain a target picture performed by the device includes:
   taking a screenshot of the target interface in response to a user operation, to obtain the target picture.

In a possible implementation, when the instructions are executed by the device, the step of processing the target interface, to obtain a target picture performed by the device includes:

invoking a picture corresponding to the target interface in response to a user operation, to obtain the target picture.

In a possible implementation, the first operation of the user includes tapping one or more buttons in a specified manner.

In a possible implementation, the first operation of the user includes tapping, by touching a screen, a preset icon displayed in a notification bar or a floating window.

In a possible implementation, the first operation of the user includes sending a voice for interaction with a voice assistant.

In a possible implementation, the first operation of the user includes double tapping a power button, and when the instructions are executed by the device, the step of entering a screen-locked state, and obtaining a first picture displayed in the screen-locked state, in response to a first operation of the user; and processing the target interface, to obtain a target picture performed by the device includes:

locking a screen and storing the target interface in response to tapping the power button for the first time; and taking a screenshot of the target interface in response to tapping the power button for the second time after a preset time interval, to obtain the target picture.

In a possible implementation, when the instructions are executed by the device, the device further performs the following step: hiding a message prompt in the screen-locked state.

In a possible implementation, when the instructions are executed by the device, the device further performs the following step:

zooming in or out the target picture and/or moving the target picture in the screen-locked state in response to a second operation of the user.

The electronic device shown in FIG. 5 may be a terminal device or a circuit device built into the terminal device. The device may be configured to perform functions/steps in the methods provided in the embodiments shown in FIG. 1 and FIG. 2 of this application.

As shown in FIG. 5, the electronic device 900 includes a processor 910 and a transceiver 920. Optionally, the electronic device 900 may further include a memory 930. The processor 910, the transceiver 920, and the memory 930 may communicate with each other through an internal connection path to transfer a control signal and/or a data signal. The memory 930 is configured to store a computer program. The processor 910 is configured to: invoke the computer program from the memory 930 and run the computer program.

The memory 930 may be a read-only memory (ROM), another type of static storage device that can store static information and instructions, or a random access memory (RAM) or another type of dynamic storage device that can store information and instructions, or an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a Blu-ray disc, and the like), a magnetic disk storage medium or another magnetic storage device, any other medium that can be used to carry or store expected program code in a form of instructions or a data structure and that can be accessed by a computer, or the like.

Optionally, the electronic device 900 may further include an antenna 940, configured to send a wireless signal output by the transceiver 920.

The processor 910 and the memory 930 may be integrated into one processing apparatus, or more commonly be components independent of each other. The processor 910 is configured to execute program code stored in the memory 930 to implement the foregoing functions. In a specific implementation, the memory 930 may alternatively be integrated into the processor 910, or may be independent of the processor 910.

In addition, the electronic device 900 may further include one or more of an input unit 960, a display unit 970, an audio circuit 980, a camera 990, a sensor 901, and the like, to improve the functions of the electronic device 900. The audio circuit may further include a speaker 982, a microphone 984, and the like. The display unit 970 may include a display.

Optionally, the electronic device 900 may further include a power supply 950, configured to supply power to various components or circuits in the terminal device.

It should be understood that the electronic device 900 shown in FIG. 5 can implement processes of the methods provided in the embodiments shown in FIG. 1 and FIG. 2 in this application. Operations and/or functions of the modules of the electronic device 900 are separately intended to implement corresponding processes in the foregoing method embodiments. For details, refer to the descriptions in the method embodiments shown in FIG. 1 and FIG. 2 in this application. To avoid repetition, detailed descriptions are appropriately omitted herein.

It should be understood that the processor 910 in the electronic device 900 shown in FIG. 5 may be a system-on-chip SOC, and the processor 910 may include a central processing unit (CPU for short), and may further include another type of processor, for example, a graphics processing unit (GPU for short).

In conclusion, some processors or processing units in the processor 910 may cooperate to implement the foregoing method procedure, and software programs corresponding to the processors or processing units may be stored in the memory 930.

This application further provides an electronic device. The device includes a storage medium and a central processing unit. The storage medium may be a non-volatile storage medium, and the storage medium stores a computer executable program. The central processing unit is connected to the non-volatile storage medium, and executes the computer executable program to implement the methods provided in the embodiments shown in FIG. 1 and FIG. 2 in this application.

In the foregoing embodiments, the processor may include, for example, a CPU, a DSP, a microcontroller, or a digital signal processor, and may further include a GPU, an embedded neural-network processing unit (NPU for short), and an image signal processor (ISP for short). The processor may further include a necessary hardware accelerator or a logic processing hardware circuit, for example, an ASIC, or one or more integrated circuits configured to control program execution of the technical solutions in this application. In addition, the processor may have a function of operating one or more software programs. The software program may be stored in a storage medium.

An embodiment of this application further provides a computer-readable storage medium. The computer-readable storage medium stores a computer program. When the computer program is run on a computer, the computer is enabled to perform the methods provided in the embodiments shown in FIG. 1 and FIG. 2 in this application.

An embodiment of this application further provides a computer program product. The computer program product includes a computer program. When the computer program is run on a computer, the computer is enabled to perform the methods provided in the embodiments shown in FIG. 1 and FIG. 2 in this application.

In embodiments of this application, "at least one" means one or more, and "a plurality of" means two or more. A term "and/or" describes an association relationship between associated objects and indicates that three relationships may exist. For example, A and/or B may indicate the following three cases: Only A exists, both A and B exist, and only B exists, where A and B may be singular or plural. The character "/" generally indicates an "or" relationship between the associated objects. At least one of the following items and a similar expression thereof refer to any combination of these items, including a single item or any combination of plural items. For example, at least one item of a, b, or c may indicate a, b, c, a and b, a and c, b and c, or a, b, and c, where a, b, and c may be singular or plural.

A person of ordinary skill in the art may be aware that, with reference to embodiments disclosed in this specification, described units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments of this application, when any of the functions is implemented in a form of a software function unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes: any medium that can store program code, such as a USB flash drive, a removable hard disk, a read-only memory (ROM for short), a random access memory (RAM for short), a magnetic disk, or a compact disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. An interface information presenting method, comprising: obtaining a target interface; in response to a first operation of a user, entering a screen-locked state, and obtaining a first picture displayed in the screen-locked state; processing the target interface to obtain a target picture;
   and displaying the target picture in the screen-locked state to cover the first picture,
   wherein: the first operation of the user comprises double tapping a power button, and the in response to a first operation of the user, entering a screen-locked state, and obtaining a first picture displayed in the screen-locked state; and processing the target interface to obtain a target picture comprises: locking a screen and storing the target interface in response to tapping the power button for the first time; and taking a screenshot of the target interface in response to tapping the power button for the second time after a preset time interval to obtain the target picture.

2. The method according to claim 1, wherein the processing the target interface to obtain a target picture comprises: taking a screenshot of the target interface to obtain the target picture.

3. The method according to claim 1, wherein the processing the target interface to obtain a target picture comprises: invoking a picture corresponding to the target interface to obtain the target picture.

4. The method according to claim 1, wherein the first operation of the user comprises tapping one or more buttons in a specified manner.

5. The method according to claim 1, wherein the first operation of the user comprises tapping, by touching a screen, a preset icon displayed in a notification bar.

6. The method according to claim 1, wherein the first operation of the user comprises tapping, by touching a screen, a preset icon displayed in a floating window.

7. The method according to claim 1, further comprising: hiding a message prompt in the screen-locked state.

8. The method according to claim 1, further comprising: zooming in or out the target picture in the screen-locked state in response to a second operation of the user.

9. The method according to claim 1, further comprising: moving the target picture in the screen-locked state in response to a second operation of the user.

10. An electronic device, comprising: a display; one or more processors; one or more memories; a plurality of applications; and one or more computer programs, wherein the one or more computer programs are stored in the one or more memories, the one or more computer programs comprise instructions, and when the instructions are executed by the one or more processors, the electronic device is enabled to perform the following steps: obtaining a target interface; in response to a first operation of a user, entering a screen-locked state, and obtaining a first picture displayed in the screen-locked state; processing the target interface to obtain a target picture; and displaying the target picture in the screen-locked state to cover the first picture,
   wherein: the first operation of the user comprises double tapping a power button, and when the instructions are executed by the one or more processors, the step of in response to a first operation of the user, entering a screen-locked state, and obtaining a first picture displayed in the screen-locked state; and processing the target interface to obtain a target picture comprises: locking a screen and storing the target interface in response to tapping the power button for the first time; and taking a screenshot of the target interface in response to tapping the power button for the second time after a preset time interval, to obtain the target picture.

11. The electronic device according to claim 10, wherein when the instructions are executed by the one or more processors, the step of processing the target interface to obtain a target picture comprises: taking a screenshot of the target interface in response to a user operation to obtain the target picture.

12. The electronic device according to claim 10, wherein when the instructions are executed by the one or more processors, the step of processing the target interface to obtain a target picture comprises: invoking a picture corresponding to the target interface in response to a user operation to obtain the target picture.

13. The electronic device according to claim 10, wherein the first operation of the user comprises tapping one or more buttons in a specified manner.

14. The electronic device according to claim 10, wherein the first operation of the user comprises tapping, by touching a screen, a preset icon displayed in a notification bar or a floating window.

15. The electronic device according to claim 10, wherein when the instructions are executed by the one or more processors, the electronic device further performs the following step: hiding a message prompt in the screen-locked state.

16. The electronic device according to claim 10, wherein when the instructions are executed by the one or more processors, the electronic device further performs at least one of the following step: zooming in or out the target picture or moving the target picture in the screen-locked state in response to a second operation of the user.

17. A non-transitory computer-readable storage medium, wherein the computer-readable storage medium stores a computer program, and when the computer program is run on a computer, the computer is enabled to perform the following steps: obtaining a target interface; in response to a first operation of a user entering a screen-locked state, and obtaining a first picture displayed in the screen-locked state; processing the target interface to obtain a target picture; and displaying the target picture in the screen-locked state to cover the first picture, wherein: the first operation of the user comprises double tapping a power button, and when the instructions are executed by the one or more processors, the step of in response to a first operation of the user, entering a screen-locked state, and obtaining a first picture displayed in the screen-locked state; and processing the target interface to obtain a target picture comprises: locking a screen and storing the target interface in response to tapping the power button for the first time; and taking a screenshot of the target interface in response to tapping the power button for the second time after a preset time interval, to obtain the target picture.

18. The non-transitory computer-readable storage medium according to claim 17, wherein the step of processing the target interface to obtain a target picture performed by the computer comprises: taking a screenshot of the target interface in response to a user operation, to obtain the target picture.

* * * * *